US005219641A

United States Patent [19]

Mehta et al.

[11] Patent Number: 5,219,641

[45] Date of Patent: Jun. 15, 1993

[54] THERMAL TRANSFER IMAGE RECEPTION COATED PAPER

[75] Inventors: Rajendra Mehta, Centerville; Gary Cairns, Tipp City, both of Ohio

[73] Assignee: The Standard Register Company, Dayton, Ohio

[21] Appl. No.: 653,146

[22] Filed: Feb. 11, 1991

[51] Int. Cl.5 .................... B32B 3/00

[52] U.S. Cl. .................... 428/211; 428/195; 428/488.4; 428/511; 428/913; 428/914

[58] Field of Search .................... 428/211, 488.4, 913, 428/914, 511, 195

[56] References Cited

U.S. PATENT DOCUMENTS

| | | | |
|---|---|---|---|
| 3,861,922 | 1/1975 | Minoda | 96/87 R |
| 3,989,609 | 11/1976 | Brack | 204/189 |
| 4,092,173 | 5/1978 | Novak et al. | 96/119 |
| 4,130,708 | 12/1978 | Friedlander et al. | 528/28 |
| 4,171,979 | 10/1979 | Novak et al. | 96/119 |
| 4,319,811 | 3/1982 | Tu et al. | 351/166 |
| 4,333,998 | 6/1982 | Leszyk | 430/12 |
| 4,477,548 | 10/1984 | Harasta et al. | 430/15 |
| 4,591,887 | 5/1986 | Arbree et al. | 346/200 |
| 4,626,256 | 12/1986 | Kawasaki | 8/471 |
| 4,670,295 | 6/1987 | Quinn et al. | 427/54.1 |
| 4,886,774 | 12/1989 | Doi | 503/226 |

FOREIGN PATENT DOCUMENTS 0209353 1/1987 European Pat. Off. .

*Primary Examiner*—B. Hamilton Hess
*Assistant Examiner*—Elizabeth Evans
*Attorney, Agent, or Firm*—Killworth, Gottman, Hagan & Schaeff

[57] ABSTRACT

A coating composition is provided for various substrates which renders them receptive to thermal transfer images formed thereon and provides the substrates and images with resistance to moisture, abrasion, and solvents. A mixture of radiation curable oligomers, monomers, and optionally a free radical initiator are blended together, coated onto a substrate, and then cured. Other optional components in the coating include an adhesion promoter, coloring agents, pigments, and/or fillers.

10 Claims, No Drawings

THERMAL TRANSFER IMAGE RECEPTION COATED PAPER

BACKGROUND OF THE INVENTION

This invention relates to a radiation curable coating for use on various substrates, and more particularly to a coating for substrates which renders them receptive to thermal transfer images and provides the substrate with resistance to heat, moisture, abrasion, and solvents.

In the field of product labeling, thermal transfer printing has become a well-known means of non-impact printing. Thermal transfer printing of bar codes not only provides fast inventory and quick identification of products, but also provides an advantage over direct thermal printing in that thermal transfer printing uses a ribbon with the print head whereas direct thermal printing is dependent upon having heat-reactive chemicals present in the substrate.

However, in thermal transfer printing, the print quality of the images transferred from the ribbon to the substrate are dependent upon the receptivity of the substrate surface. Many grades of paper have rough surfaces which are unsuitable for use in thermal transfer printing, and may result in character formation in which there are voids or irregular edges. Other substrates, including some grades of paper, may also be unreceptive to thermal transfer images. Further, where substrates have previously been printed with inks, such printed surfaces may not be receptive to thermal transfer images.

Protective coatings for substrates are known in the art for direct thermal and electrographic printing. In addition, coatings have been developed for protection of thermally printed images against environmental factors such as moisture, abrasion, and solvents. For example, U.S. Pat. No. 4,886,774 to Doi teaches a protective overcoating for thermal paper which comprises a light stabilizer, an additive for promoting curing of the coating by ultraviolet radiation, and a second additive which serves as a an UV absorbing compound to provide resistance to fading.

Arbee et al, U.S. Pat. No. 4,591,887, relates to a solvent-resistant thermally printable material for the manufacture of labels comprising a protective layer of polymeric resin on top of a thermally imprintable color producing layer and an adhesive layer.

Although these references disclose protection of thermally printed images, the coatings are applied to thermal paper for use in direct thermal printing. Thermally imageable paper has already been coated with a heat-sensitive substance to allow it to react and form an image when exposed to a thermal printer. The protective coatings discussed above thus only serve as an overcoat for the images which are formed within the thermally imageable coating on the paper, and are not designed to render paper receptive to thermal transfer images.

Other protective coatings have been developed for use on a variety of substrates such as wood, metal, paper, glass, and ceramic materials. Friedlander et al, U.S. Pat. No. 4,130,708, relates to a protective coating composition which includes radiation curable compounds formed from the reaction of a siloxy-containing carbinol, a polyisocyanate, and a polyfunctional compound having hydroxy and acrylic functional groups. However, the coating is not directed to thermal transfer printing, and thus does not address the problems associated with the transfer of such images to a substrate surface; i.e., complete character formation and receptivity to thermal transfer images.

Accordingly, there is a need in the art for a coating for substrates such as paper which makes them receptive to thermal transfer imaging, provides good print quality of thermal transfer images formed thereon, and provides the substrate with resistance to heat, moisture, abrasion, and solvents.

SUMMARY OF THE INVENTION

The present invention meets that need by providing a radiation curable coating suitable for use on various substrates which adheres strongly to the substrate and renders it receptive to images from a thermal transfer printer. For example, the coatings of the present invention may be applied to coated or uncoated electronic data processing papers, bond papers, and other business forms, high quality calendered papers, and cast coated papers. The coatings may also be applied to plastic substrates commonly used for tags, pressure sensitive label facestocks such as polyvinyl chlorides, polyesters, polypropylenes, polystyrenes, polyethylenes, and diacetates. Although many of these types of substrates may already be receptive to thermal transfer images, the coating adds protection to the substrate from heat, moisture, abrasion and solvents. The coating also allows images to be printed over solid inked areas of a substrate without the problem of incompatibility between press inks and the thermal transfer images.

The term "receptive" as used herein refers to the ability of the coating to provide not only a smoother surface but also a surface to which the thermal transfer image adheres well which improves the print quality of the images formed on the substrate. The coating also provides the substrate with resistance to heat, moisture, abrasion, and solvents. The coating also provides this protection to pre-printed areas of the substrate. In the preferred embodiment of the invention, the coating comprises a blend of radiation curable acrylate monomers and oligomers, and optionally, a free radical initiator, and an adhesion promoter.

The monomers present in the composition are preferably a blend of difunctional, trifunctional and multifunctional acrylates to provide the desired degree of crosslinking of the coating when cured. The preferred difunctional monomers are selected from the group consisting of ethylene glycol diacrylate, ethylene glycol dimethacrylate, 1,6-hexanediol diacrylate, and diethylene glycol dimethacrylate. The preferred trifunctional monomer is trimethylolpropane triacrylate. The preferred multifunctional monomers are selected from the group consisting of pentaerythritol tetraacrylate, pentaerythritol tetramethacrylate, and dipentaerythritol hydroxypentacrylate. The total monomer content may vary from about 20 to 55% of the total coating composition.

The preferred oligomers are urethane acrylates. The total oligomer content may vary from 10 to 35% by weight of the total coating composition.

The preferred free radical initiators include alkyl benzoin ethers, benzophenone in combination with an with an amine, acetophenone derivatives, or haloalkyl substituted aryl ketones. The initiator preferably comprises about 2 to 12% by weight of the total coating composition. Where an electron beam is used to cure the coating, the free radical initiator is not required.

The coating also optionally includes an adhesion promoter to provide good adhesion of the coating to a substrate. Preferred adhesion promoters include polymers and copolymers such as styrene-maleic anhydride, styrene-acrylic acid or styrene-methacrylic acid. Other copolymers of anhydrides and acrylics may be used provided they are soluble in the preferred acrylate monomers of trimethylolpropane triacrylate and 1,6-hexanediol diacrylate. The adhesion promoter preferably comprises about 1% of the total composition.

In addition, the protective coating may optionally include up to about 5% of a coloring agent, pigment, and/or filler. The coating may also contain a small amount of an ultraviolet stabilizer.

A surfactant such as a fluorocarbon surfactant may also be included to improve the flow of the coating onto the substrate.

The process of making the coating of the present invention comprises the steps of blending the desired radiation-curable monomers, oligomers, and optionally the free radical initiator, and then coating the mixture onto a substrate. The coating is then cured by the use of radiation, preferably by ultraviolet radiation at a wavelength of 200–400 nm. The resulting coated substrate is receptive to images from a thermal transfer printer, providing good print quality of the images. In addition, the substrates are provided with resistance to heat, moisture, abrasion, and solvents.

An advantage of the Present invention is the ability to apply the coating in liquid form to a cellulosic substrate which is either uncoated, or which itself has been previously coated or printed. The coating is then cured by a source of radiation to provide a receptive surface for thermal transfer images.

Thus, the composition and process of the present invention enable one to easily produce a radiation curable coating for various substrates which renders them receptive to thermal transfer images, exhibits good adhesion to the substrate, and provides the substrates with resistance to heat, moisture, abrasion, and solvents. As a result, substrates which are typically unsuitable for receiving thermal transfer images are provided with a receptive surface which can receive thermal transfer images without the problems of the prior art.

Accordingly, it is an object of the present invention to provide a coating for various substrates which renders them receptive to thermal transfer images, exhibits good adhesion to the substrate, and provides the substrate with resistance to heat, moisture, abrasion, and solvents.

DETAILED DESCRIPTION OF THE PREFERRED EMBODIMENTS

In its preferred form, the coating of the present invention includes a blend of radiation curable oligomers and monomers and optionally a free radical initiator. The preferred oligomers are urethane acrylates, available from The Sartomer Chemical Company, Philadelphia, Pennsylvania under the tradename SR 9620. Preferably, urethane acrylates are formed by the reaction of a diisocyanate with a diol, followed by reaction with an unsaturated alcohol. The preferred urethane acrylate has the following formula:

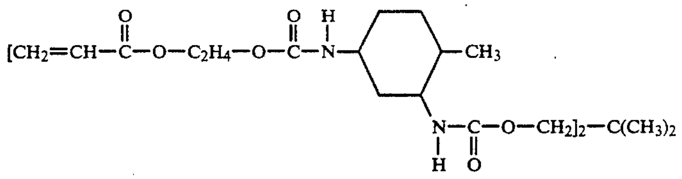

The overall content of oligomers may vary from 10 to 35% of the total coating composition.

The monomers present in the coating preferably, comprise a blend of difunctional, trifunctional and multifunctional acrylates. The difunctional monomers are selected from the group consisting of ethylene glycol diacrylate, ethylene glycol dimethacrylate, diethylene glycol-dimethacrylate, and 1,6-hexanediol diacrylate, available from The Sartomer Chemical Company under the designation SR 328. The trifunctional monomer is trimethylolpropane triacrylate, available from The Sartomer Chemical Company under the designation SR 351. The multifunctional monomers are selected from the group consisting of pentaerythritol tetraacrylate, pentaerythritol tetramethacrylate, and dipentaerythritol hydroxypentacrylate. The overall monomer content may vary from about 20 to 75% of the total coating composition.

An adhesion promoter is optionally included in the coating to ensure sufficient adhesion of the coating to the substrate. Suitable adhesion promoters include polymers and copolymers having acid functional groups including copolymers of styrene-maleic anhydride, styrene-acrylic acid, or styrene-methacrylic acid. Such acid-containing polymers have low molecular weights so that they are soluble in the preferred blend of oligomers and monomers. The adhesion promoter is preferably present in an amount of from about 1.0 to 1.5% by weight of the total composition.

The preferred free radical initiators are those which provide a sufficient cure rate and do not interfere with the properties of the coating. Suitable free radical initiators include alkyl benzoin ethers such as benzoin ether benzophenone, benzophenone in combination with an amine such as triethylamine, methyldiethanol amine, or dimethylaminobenzophenone, and acetophenone derivatives such as 2,2'-diethoxyacetophenone and t-butyl-α-trichloro acetophenone. In addition, haloalkyl substituted aryl ketones are suitable for use as initiators.

If desired, the coating may optionally include a coloring agent such as pigments, an opaquing agent such as fumed silica or precipitated calcium carbonate, and/or fillers. The coating may also contain a small amount of an ultraviolet stabilizer.

In addition, a surfactant such as a fluorocarbon surfactant may be added to improve the flow of the coating onto the substrate.

The coating is preferably cured by exposure to ultraviolet radiation at a wavelength of from 200-400 nm, although electron beam or atomic radiation such as gamma may also be used. If cured by electron beam radiation, it is not necessary to include an initiator in the composition.

The process of the present invention comprises the steps of blending the oligomers, monomers, and optionally the initiator, and the adhesion promoter, and then coating the mixture onto the desired substrate. The substrate may be coated or uncoated electronic data processing papers, bond papers, or calendered papers. The coating may be applied by any of several conventional processes including flexography, roll coating, offset gravure, blade, etc. The substrate may be printed or unprinted. The coating is then cured by ultraviolet radiation. Images may then be formed on the substrate by a thermal transfer printer as is conventional in the art.

In order that the invention may be more readily understood, reference is made to the following example which is intended to illustrate the invention, but not limit the scope thereof.

EXAMPLE 1

A protective coating composition was prepared in accordance with the present invention by blending 25.64% (weight percentage) urethane acrylate, 42.73% trimethylolpropanetriacrylate, and 17.09% 1,6-hexanedioldiacrylate, all available from The Sartomer Chemical Company; 4.2% tertiary amine, available from Radcure Specialists, 8.54% benzophenone, and 0.85% fluorocarbon surfactant to improve the flow of the coating onto the substrates. The composition was applied by flexographic printing to a coated substrate and an uncoated substrate, and then cured under a 300 watt per inch medium mercury pressure U.V. lamp at a wavelength of 200 to 400 nm and a speed of 150 to 170 feet per minute. The cured coating exhibited satisfactory receptivity to thermal transfer images and provided satisfactory chemical resistance to common cleaning agents and solvents for the substrate.

EXAMPLE 2

A protective coating composition was prepared in accordance with the present invention by blending a mixture of 70.10% (weight percentage) 1,6-hexanediol diacrylate, available from The Sartomer Chemical Company, and 29.90% styrene-maleic anhydride, available from Autochem, with 24.10% urethane acrylate, 13.79% 1,6-hexanediol diacrylate, 34.48% trimethylolpropanetriacrylate, 4.82% monohydroxy pentacrylate, 10.30% urethane acrylate, 11.40% initiator, and 1.50% fluorocarbon surfactant. The coating was applied to coated paper, uncoated paper, and polymeric film and then cured under a 300 watt per inch mercury lamp at 170 to 200 feet per minute. The cured coating exhibited good receptivity to thermal transfer images, resistance to abrasion and chemicals, and good adhesion to the substrates.

Having described the invention in detail and by reference to preferred embodiments thereof, it will be apparent that modifications and variations are possible without departing from the scope of the invention defined in the appended claims.

What is claimed is:

1. A coated paper or plastic which is receptive to thermal transfer images comprising a paper or plastic substrate and a coating layer on said substrate comprising a blend of radiation curable acrylate monomers or oligomers, wherein said oligomers comprise urethane acrylates, and said monomers comprise a blend of acrylates having two or more functional groups and an adhesion promoter which is soluble in said blend of monomers or oligomers to provide adhesion of said coating layer to said substrate, said coating layer rendering the surface of said paper or plastic substrate receptive to thermal transfer images and providing protection to said substrate from moisture, abrasion, and solvents.

2. The coated paper or plastic of claim 1 wherein said coating layer further comprises a coloring agent.

3. The coated paper or plastic of claim 1 wherein said coating layer further comprises a surfactant.

4. The coated paper or plastic of claim 1 wherein said coating includes a free radical initiator and is cured by exposure to ultraviolet radiation.

5. The coated paper or plastic or claim 1 wherein said adhesion promoter is selected from the group consisting of styrene-maleic anhydride, styrene-acrylic acid, and styrene-methacrylic acid.

6. The coated paper or plastic or claim 1 wherein said coating includes a free radical initiator and is comprised of from about 10–35% by weight of said urethane acrylates, from about 20–75% by weight of said blend of acrylates having two or more functional groups, from about 2–12% by weight of said free radical initiator, and from about 1–1.5% by weight of said adhesion promoter.

7. A printed coated paper or plastic which is receptive to thermal transfer images comprising a paper or plastic substrate having soldi inked areas printed thereon and a coating layer on said substrate and over said solid inked areas comprising a blend of radiation curable acrylate monomers or oligomers, wherein said oligomers comprise urethane acrylates, and said monomers comprise a blend of acrylates having two or more functional groups, said coating layer rendering the surface of said paper or plastic substrate receptive to thermal transfer images even in those solid inked areas of said substrate and providing protection to said substrate from moisture, abrasion, and solvents.

8. The coated paper or plastic of claim 7 including an adhesion promoter to provide adhesion of said coating layer to said substrate.

9. The coated paper or plastic of claim 8 wherein said adhesion promoter is selected from the group consisting of styrene-maleic anhydride, styrene-acrylic acid, and styrene-methacrylic acid.

10. The coated paper or plastic of claim 8 wherein said coating includes a free radical initiator and is comprised of from about 10–35% by weight of said urethane acrylates, from about 20–75% by weight of said blend of acrylates having two or more functional groups, from about 2–12% by weight of said free radical initiator, and from about 1–1.5% by weight of said adhesion promoter.

* * * * *